UNITED STATES PATENT OFFICE.

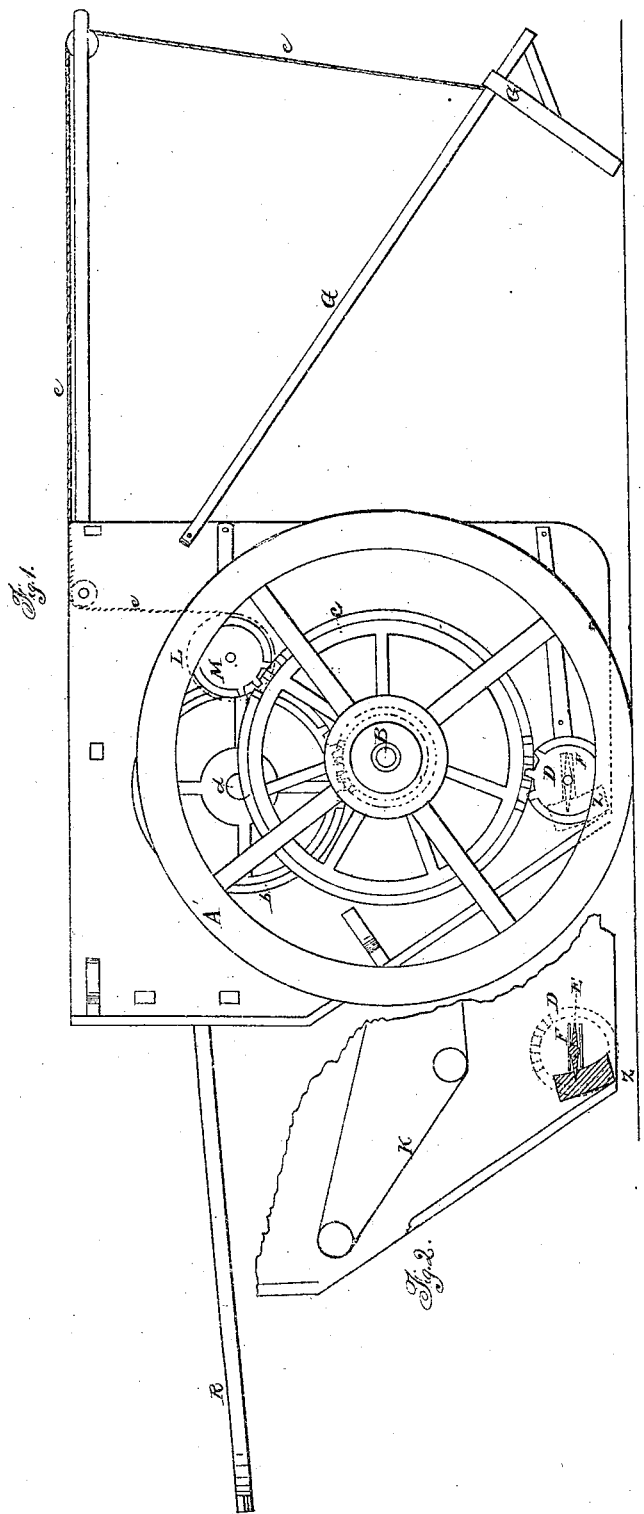

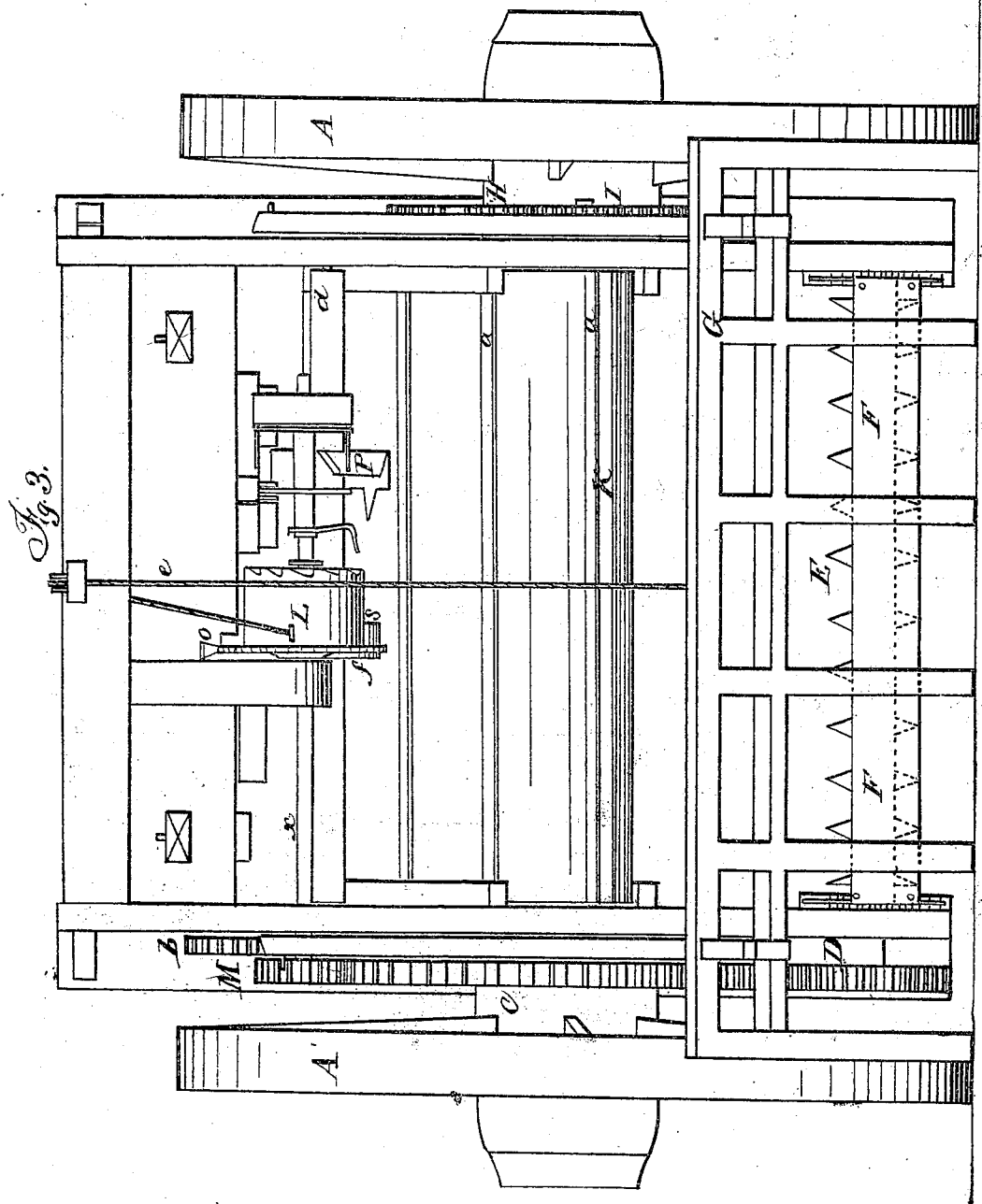

RICHARD RAY, OF LOUISPORT, KENTUCKY.

IMPROVEMENT IN MACHINES FOR GATHERING COTTON-STALKS.

Specification forming part of Letters Patent No. 13,436, dated August 14, 1855.

*To all whom it may concern:*

Be it known that I, RICHARD RAY, of Louisport, in the county of Hancock and State of Kentucky, have invented certain new and useful Improvements in Machines for Harvesting Cotton-Stalks; and I do hereby declare that the following is a full, clear, and exact description of the same, reference being had to the accompanying drawings, forming a part of this specification, of which—

Figure 1 is an elevation showing the rake in position for gathering and the various cog-gear upon one side of the machine; Fig. 2, section exhibiting the device for removing the stalks from the puller-plate E; Fig. 3, an elevation from the rear of the machine.

To enable others skilled in the art to construct and use my improvement, I will describe the manner of using and the mode or construction, the better to explain the same.

The machine, on being propelled by the horse-shaft R, gives motion to the driving-wheels A A', secured on the axle B. On the hub of wheel A' (to the left of the machine, as seen from the rear) is a cog-wheel, C, meshing in a pinion, D, at the lower edge of the side of the machine. This pinion actuates the revolving saw, tooth-plate, or puller E, as it is on the shaft carrying the pinion D. The teeth of E lay hold on the stalk of the cotton near the earth, and the stalk having been previously bent backward and directed over E by the revolving endless band K, (said band may be furnished with cross slats or bars a a, if found necessary,) the bushy nature of the cotton-plant assists in readily bringing it into a proper position for the hooks or teeth of plate E to draw the plant up by the roots. On the further revolution of the plate the stalks are forced off the teeth by means of a sliding plate, F, which forms a shield to the teeth of one side of E, when the edge of F is brought in contact with the guide Z, and, being liberated, drop on the ground at the rear of the wheels, to be afterward gathered in bunches by a rake, G, attached to the back of the machine.

On the hub of the wheel, on the right-hand side, is secured a spur-wheel, H, which meshing into pinion I, motion is given to an endless band, K. (See Fig. 2.)

The movements of the rake G are produced by gear-wheel b on shaft d, revolving a cam, p, on said shaft, whose object is the throwing the clutch in and out of play, for revolving the drum L of the rake-windlass or suffering it to be loose upon the shaft X.

When the clutch fastens L on the shaft X the motion of M, (also on X,) driven by cog-wheel C, causes the drum L to wind the cord c, and thus draws up the rake sufficiently high to pass over the gathered stalks. In winding the rope e on the drum L the rake is kept suspended by a pawl, O, dropping into ratchet-wheel f, until it clears the heap, when a trip-cam, s, upon shaft d, comes in play and by striking on the lower end of the pawl releases it, and the drum L is permitted to revolve and unwind the rope e and drop the rake for another gathering of stalks.

It will be noticed that the several pieces giving motion to the belt K, the rake G, and the tooth-plate E all admit of being thrown out of gear by moving levers they are on.

The method in which the stalks are thrown off the saw-teeth of the puller-plate E (shown in dotted line, Fig. 1, and in section, Fig. 2) is as follows: The plate E has a guard-plate, F, covering its width, except the length of teeth on one side, forming a shield to the teeth of one side, while the opposite ones project. This shield slides from side to side of the plate E and revolves with it. As F is revolved its edge comes in contact with the guide Z, projecting from the side of the machine, and being thus forced over the plate E throws off or removes the stalks from the teeth thereof opposite the guide Z, while the the teeth of the said plate on the other edge are exposed and draw the stalks in the manner before described.

This machine greatly facilitates the culture of cotton by removal of the stalks, and, as the plant is of a bushy character, the troublesome and difficult operation of clearing a cultured field of the dead plants is performed by horse instead of manual power, hitherto employed.

Having thus fully described my improved machine for harvesting cotton-stalks, what I claim as my invention, and desire to secure by Letters Patent of the United States, is—

The arrangement of the apron K, plate E, and rake G, all operated in the manner described, for the purposes of pulling up and gathering stalks of cotton, as described in the foregoing specification.

In testimony whereof I have hereunto signed my name before two subscribing witnesses.

RICHARD RAY.

Witnesses:
  JOHN F. CLARK,
  SAML. GRUBB.